Patented Oct. 24, 1933

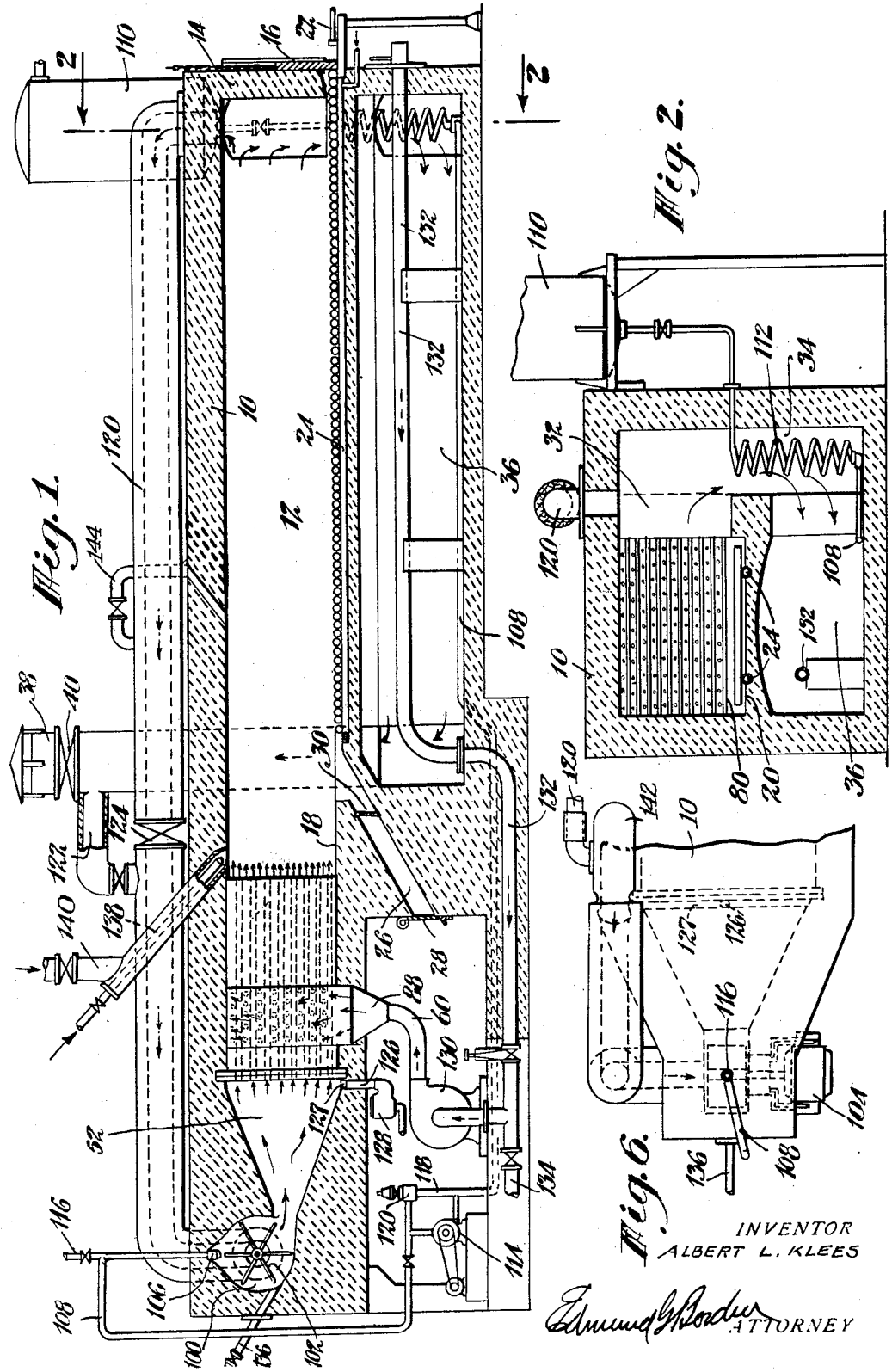

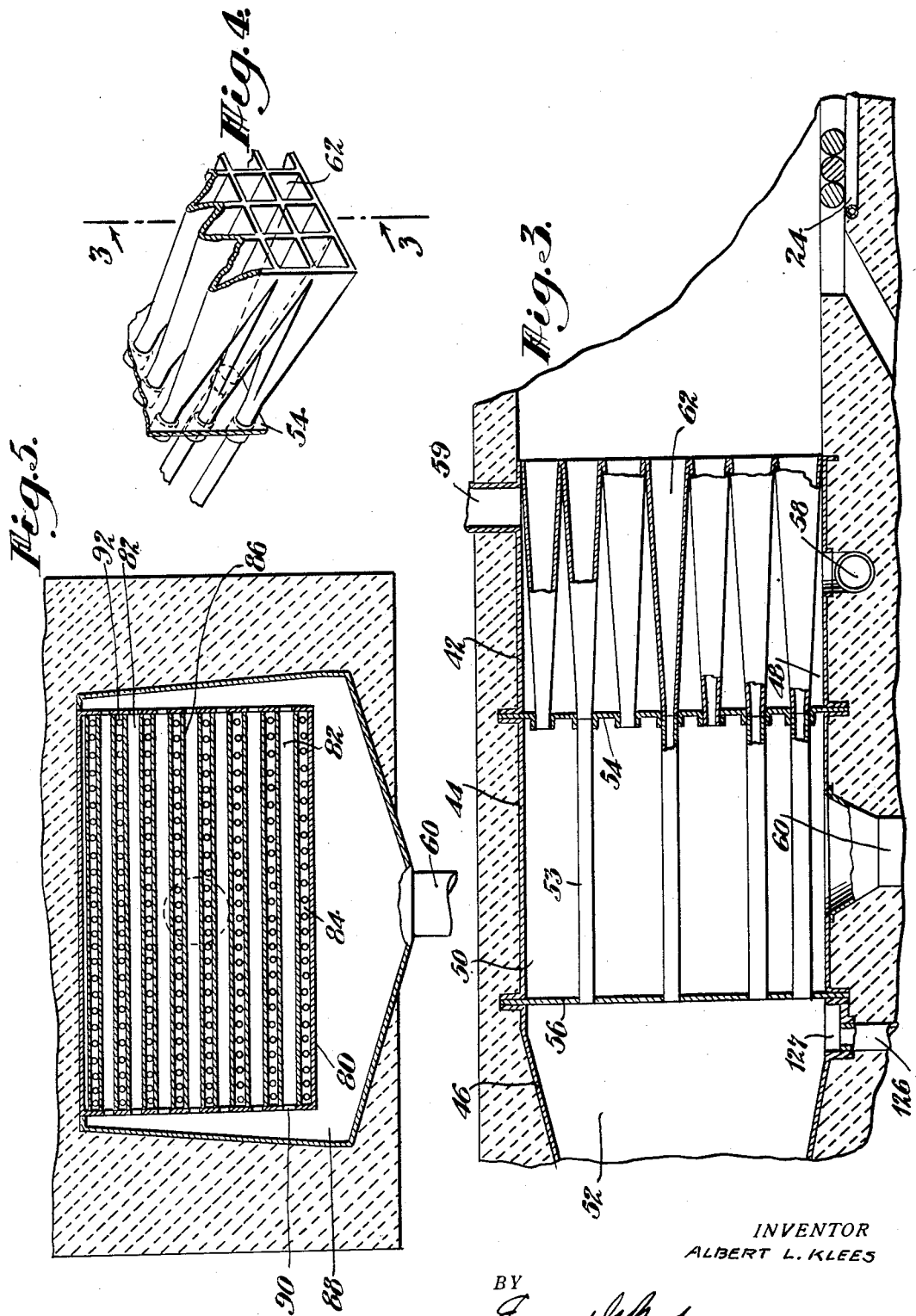

1,931,927

UNITED STATES PATENT OFFICE 1,931,927

DIFFUSION FLAME COMBUSTION USING LIQUID FUEL

Albert L. Klees, New York, N. Y., assignor to Combustion Utilities Corporation, New York, N. Y., a corporation of Maine Application July 2, 1932. Serial No. 620,576

20 Claims. (Cl. 263—9)

This invention relates to industrial high temperature heating and heating-treating operations, and more specifically it concerns a novel method and apparatus for utilizing normally liquid hydrocarbons in such commercial operations. It has especial utility in connection with the heating of materials such as steel and other metals that are subject to scaling due to the action thereon of highly heated products of combustion.

The present invention is intimately related to heating and heat-treating operations employing the diffusion-flame or luminous-flame type of combustion, described in the copending patent application of S. P. Burke, Serial No. 424,280, filed January 29, 1930,—in accordance with which process a fuel gas and air are separately introduced into a furnace combustion chamber in individual contiguous streams or strata, all moving in a common direction at such controlled velocities as to avoid substantial turbulence during combustion. The mixing of the gas and air occurs within the furnace substantially entirely by interdiffusion, so that at the various surfaces of contact of the gas and air, the conditions are favorable for combustion, but not elsewhere.

Industrial furnaces frequently must be operated at locations where a uniform and ample flow of fuel gas of a uniform heat value is not available, or where heavy loads on the fuel gas line serving other installations interferes with the uniform, continuous supply of gas to the burner of the diffusion flame furnace.

Accordingly, among the more important objects of the present invention are: the adaptation of a normally liquid or liquefiable hydrocarbon for a heating or heat-treating operation in accordance with the diffusion flame principle; to provide for combusting fuel oil vapors whereby steel and other materials may be heated to high temperatures while protected from surface deterioration; and to provide for combusting an oil vapor-gas mixture of preselected B. t. u. content with air in proportions to give an overventilated flame, while preventing oil vapor cracking prior to introduction of the said vapors into the furnace, and while obtaining flame luminosity within the latter with its attendant advantages and the production of a relatively long hot flame.

According to a preferred form of the present invention, a normally liquid hydrocarbon or mixture thereof such as fuel oil,—or a readily liquefiable hydrocarbon such as butane, either alone or dissolved in a heavier oil employed as a carrier liquid, is vaporized or atomized in the presence of a highly-heated inert or reducing gas, or a gaseous mixture, and which is free from or very low in oxidizing constituents and preferably has a low heating value.

The oil or liquid fuel may be preheated if desired up to near but below the cracking temperature of the hydrocarbon components of the fuel under the conditions of operation. The rate of atomization of the fuel oil, and the volume and temperature of the inert gas or flue gases admixed therewith are so adjusted that vaporization of substantially all or a regulated part of the oil is continuously effected within the gas stream, the resultant fluid fuel then flowing to the fuel header of a diffusion flame burner mounted in a streamline combustiton chamber of a heating or heat-treating furnace.

The hot flue gases from the furnace not only assist in preheating and volatilizing the liquid fuel but also uniformly and continuously dilute the vaporized fuel to reduce its B. t. u. value to a degree where it is adapted for use in the diffusion flame burner of a furnace of commercial design. Such burner preferably is designed to introduce into the furnace sufficient air for substantially complete combustion of the vaporized fuel flowing to it when the relative velocities of the air and fuel are approximately the same. Since undiluted oil vapor generally contains approximately 8000 B. t. u. per cu. ft.—(and to burn 1 cu. ft. of this undiluted vapor 80 cu. ft. of air are required,)—a diffusion flame burner for use with this rich vapor is impractical and requires a ratio of total air duct area to total fuel vapor duct area of 80:1, when providing approximately equal flow velocities for the fuel vapor and air. Fuel ducts having a width or thickness of only 1/80 inch would in some cases be necessitated. Such ducts could not function properly, and would be impracticable from a construction standpoint.

In accordance with the present invention, fuel oil volatilization is so conducted that the resultant fluid fuel mixture has a uniform controlled B. t. u. value within the range from 200 to 2000 B. t. u. per cu. ft. Mixtures having heating values within the range from 500 to 1000 B. t. u. per cu. ft. are particularly suitable for use in present commercial heat-treating operations.

The mixed oil vapors and gases from the oil vaporization zone, hereinafter described as the "fluid fuel", then flow directly to the adjacent distributing head of a diffusion flame furnace, during which flow any unvaporized liquid separates out and is removed.

Within the diffusion flame burner the fluid fuel passes for a brief period in indirect heat exchange relation with either cold or preheated air flowing through the burner ducts to the furnace. Preferably the temperatures of the air and of the fluid fuel are approximately the same as they enter the respective air and fuel ducts,—although this is not essential.

The respective streams of air and fluid fuel may flow to the combustion chamber either through parallel burner slots, or tubes or in parallel or concentric tubular burner ducts,— and the velocities of the respective fluid fuel and air streams are preferably approximately equal as they enter the furnace. Considerable variation in the relative velocities of the fluid fuel and the air streams is possible, however, without creating turbulence within the highly heated combustion zone.

Within the furnace the streamline flow of the moving fluids is greatly facilitated by the high temperatures maintained therein, and by the design of the interior walls of the furnace, the same being so constructed that the combustion chamber is substantially free of material abrupt changes in internal cross section.

In the accompanying drawings:

Fig. 1 is a vertical section through one form of furnace exemplifying the invention;

Fig. 2 is a transverse vertical section through the furnace along the lines 2—2 of Fig. 1;

Fig. 3 is a longitudinal vertical section through one form of diffusion flame burner assembly showing adjacent parts;

Fig. 4 is a fragmentary view in perspective of certain elements of the burner of Fig. 3;

Fig. 5 is a transverse vertical section through a modified form of burner construction;

Fig. 6 is a plan view of the oil vaporizing and atomizing apparatus of Fig. 1, somewhat modified.

Referring now to the drawings, numeral 10 designates a furnace suitably lined with refractory material. An elongated heating and combustion chamber 12 of substantially uniform cross-section throughout its length has a work receiving end wall 14, provided with an opening controlled by a door 16.

The opposite end of the chamber 12 has a throat 18, the floor of which is preferably disposed above the floor 20 of the chamber 12, a distance approximately equal to the height of the work to be heated therein. A work charging device 22 is provided at the end 14 of the furnace for introducing into the chamber 12 the material to be heated. Work-supporting tracks 24, which may be hollow and water-cooled, are provided. An inclined work-discharging chute 26 having therein a pair of spaced apart closing members 28, 30 is adapted to permit removal of the work while preventing substantial fluid flow between the furnace and the outer atmosphere.

For removing the products of combustion from the chamber 12, a flue 32 is provided in one or both side walls of the furnace adjacent the work-receiving end thereof,—the same communicating through the passageway 34 with a horizontal flue or regenerator chamber 36 disposed below the chamber 12, the opposite end of which is connected with a stack 38, controlled by stack valve 40.

Referring now to the form of burner construction more particularly set out in Figs. 3 and 4, there is provided a burner tube assembly comprising three connected casing sections 42, 44, and 46, forming respectively a cooling or heat exchange chamber 48, an air supply chamber 50, and a tapered fuel-mixture distributing chamber 52, separated by partitions 54 and 56, the conduits for supplying and removing cooling fluid and for supplying air being indicated at 58, 59, and 60 respectively. A plurality of tubular members 62 of heat resistant alloy and having sloping side walls and merging into each other at their larger ends adjacent the burner outlet are mounted within the casing 42. Certain of the tubes are connected at their small ends with the chamber 52 through ducts 53 extending through the chamber 44. Others of the tubes open directly into the chamber 50 and serve as air-conducting tubes.

Preferably all of the tubes in the lowermost row are connected with the chamber 52 in order that a flowing layer of protective vapors or reducing gases may be maintained upon and around the material being heated. Most of the tubes of course serve as air tubes, since a much larger volume of air than fuel vapors is needed for the substantially complete combustion of the latter.

In the form shown in Figs. 3 and 4, the arrangement preferably is such that each gas conducting duct above the two lowermost rows thereof is completely surrounded by air conducting tubes, so that the various gas strata or streams leaving the burner are completely surrounded by air.

According to the modification shown in Figs. 2 and 5, the burner assembly comprises a housing 80, the same being divided into a number of superposed slots or ducts, 82, 84, by a plurality of thin partitions 86 of heat resistant metal such as "Rezistal". An air distributing header 88 surrounds the housing 80 through a portion of its length and is supplied through the conduit 60 with a current of air or its equivalent. Communication is maintained between the interior of the air header 88 and each of the slots 82 through apertures 90 arranged at each side of the housing 80. The end of each duct 84 opposite the burner outlet is provided with a plurality of apertures 92 establishing communication between these ducts and the chamber 52.

In certain specific burner assemblies of the type shown in Figs. 2 and 5, the lowermost fuel ducts have had effective heights of from ½ to 1 inch; and the remaining fuel ducts have been in the range of from ¼ to 1 inch in height.

Housed within the furnace adjacent the inlet end of the burner assembly is a vaporizing and atomizing chamber 100 having therein a bladed rotor or fan 102 driven by an electric motor or the like 104. The chamber 100 is in open unrestricted communication with the fluid fuel distributing header 52. An oil spray nozzle 106 is adapted to distribute in finely divided spray-form the fuel oil flowing thereto under pressure through a line 108 and to impinge the same upon the blades of the fan 102.

The oil to be utilized in the process may be continuously drawn from the oil supply tank 110 through the valved line 108 to the nozzle 106 by means of a pump 114 or its equivalent. If desired, cold oil may be fed under pressure to the nozzle 106 through valved conduit 116; or oil may be fed to the nozzle simultaneously from both the conduits 108 and 116. A by-pass line 118 controlled by a pressure-regulating valve 120 by-passes the pump 114, to prevent accidental injury to the oil conduits or pump. A portion of the oil conduit 108, in the form of a heating coil 112, is located in the passageway 34 from whence the conduit leads through the flue gas passage 36, for the purpose of preheating the oil to the desired temperature prior to vaporizing it.

An insulated flue gas conduit 120 leads from the flue 32 to the vaporizing chamber 100, entering the latter either adjacent to or through the hub of the fan 102. A short valve-controlled flue-gas conduit 122 connects the stack 38, at a point below the valve 40 therein, with the conduit 120 at a point between a valve 124 in that line and the chamber 100.

For condensing and withdrawing from the fluid fuel distributing header 52 any unvaporized oil or any fluid condensate formed either while bringing the furnace up to working temperature or thereafter,—there is provided a liquid drain line 126 having therein a trap 128 of well known construction and connecting with a transverse slot 127 in chamber 52.

For introducing air into the section 50 of the burner, at a controlled rate, there is provided a fan 130 having its outlet directly connected with the header 60. The inlet end of the fan is connected through a valved conduit 132 with the outer air, the said conduit extending through the return flue 36 for the purpose of preheating the air to a desired degree. The inlet end of the fan is also connected with a valved air conduit 134, for introducing cold air into the burner housing or for tempering the preheated air entering the fan through conduit 132. The fan preferably is operated by a constant speed motor and regulation of the valves in air lines 132, 134,—although a variable speed motor or its equivalent may be used for adjusting the rate of delivery of air to the burner assembly.

For bringing the cold furnace up to the necessary operating temperature and for producing flue gases which have sufficient heat to effect the oil vaporization, in the apparatus described, there is provided a valved fuel gas line 136 opening into the chamber 100. Fuel gas or oil or both may be introduced into the chamber 12 for the same purpose, through one or more valved conduits 138 and combusted with air introduced therewith through conduit 140 or separately through conduit 60, for bringing the furnace up to the desired operating temperature,—for example, 2200° to 2400° F.

As soon as the furnace has been brought to the desired temperature, and hot flue gases are being generated, the flow of oil or gas and air through the conduits 136, 138 and 140 preferably is discontinued,—although a lean natural gas or artificial gas such as coke oven gas, cracking still gases or water gas may if desired be introduced through conduit 136 during operation, for adjusting the heating value of the fuel vapors.

In practicing the present invention in accordance with a preferred form thereof, assuming the furnace to be at a high operating temperature, a hydrocarbon oil is preheated to a temperature near but below that at which the cracking of hydrocarbons occurs,—for example to 700° F.,—and the preheated oil is sprayed under pressure in finely divided form upon the rapidly rotating blades of the fan 102, while dispersed in a stream of highly heated flue gases flowing from the furnace through the conduit 120. The rapidly spinning fan blades break the oil into a fog and the heat of the hot flue gases changes this fog into an oil gas or vapor. The resultant fluid fuel comprising a hot mixture of oil vapors and flue gases formed in the vaporization zone of the furnace then flows to the diffusion flame burner therein, and thence to the combustion or heat-treating chamber.

By the suitable control of the temperature and the rate of introduction of the flue gases into the chamber 100, and of the rate of flow and the temperature of the oil passing the nozzle 106, a fluid combustible mixture of uniform B. t. u. value is caused to flow continuously through the insulated tapered fuel distributing header 52 into and through the burner ducts. Concurrently air under suitable low pressure enters the burner casing through the conduit 60 and is distributed within the air tubes or ducts. These streams of fuel and air contact and are ignited as they enter the furnace throat due to the high temperature prevailing therein.

Both fluid fuel and air streams are so regulated that they flow at approximately the same velocity as they enter the furnace throat. Mixing of the gas and air thereafter occurs principally by diffusion as the combustion progressively proceeds at the surface of contact of the contiguous fuel and air streams. The total cross-sectional area of the gas ducts and of the air ducts is so selected as to maintain the air and fuel streams at approximately equal velocities and in suitable proportions for substantially complete combustion,—based on the composition of the hydrocarbon-containing vapors and of the oxygen-containing gas employed,—and the degree of overventilation, when such is desired.

Due to the high temperature of the furnace gases as they move through the heating chamber, and due to a furnace construction free from abrupt changes in the transverse cross-section of the flowing gases, turbulence is still further inhibited. This prevents the usual rapid gas intermixture (such as would produce a non-luminous combustion with no formation of carbon particles) and permits the incandescent carbon to persist in the gases undergoing combustion and to effectively radiate large quantities of heat to the work over a large portion of its path of travel within the furnace.

After the furnace has been brought up to the temperature required for the heat treatment of the work,—as for example to a temperature of from 2200° to 2400° F.,—the work is moved into the furnace through the opening in wall 14. The highly heated combustion gases containing therein strata of incandescent carbon, effect a rapid heating of the work, the gases thereafter passing to the flue 38 after giving up additional heat for preheating oil and air to be used in the process. Controlled portions of the flue gases are employed for directly vaporizing the preheated oil and for diluting the same to a predetermined heating value.

The lowermost duct or row of burner ducts or tubes being in communication with the fluid fuel manifold 52, a flowing blanket or atmosphere of hydrocarbon vapors substantially free of oxidizing constituents covers the work within the chamber 12, and protects the same from substantial oxidation or scaling.

An inert or reducing atmosphere containing as much as 10 per cent CO thus introduced as a flowing blanket over the work to be protected from oxidation has proved highly effective at temperatures around 2250° F. and for the required heating periods of around 45 minutes or less.

The length of the flames within the furnace may be controlled to uniformly distribute the heat within the chamber for most efficient operation. By increasing the number of tubes and decreasing their diameter while maintaining a given ratio of fluid fuel to air flowing through the burner assembly, the length of the flames can be shortened. By increasing the degree of overventilation the length of the flames is correspondingly decreased.

The following specific embodiment of the process is given for purposes of illustration only and is not intended as in any sense limiting the scope of the invention. Referring more particularly to the apparatus of Fig. 1,—a hydrocarbon oil designated #2 Gulf Oil and having an A. P. I. gravity of 30° at 60° F.,—a distillation range at atmospheric pressure between 374° and 666° F. (97% off) and having a heating value of 140,000 B. t. u. per gallon, is pumped from the storage tank 110 to the spray nozzle 106. During its passage to the latter, it is preheated by the hot flue gases flowing to the stack through the passages 34 and 36, the conditions being so adjusted that the oil reaching the spray nozzle is preheated to a temperature below its cracking temperature, and preferably in the range 600°-700° F.

The preheated oil spray from the nozzle 106 impinges upon rapidly revolving blades of the fan 102 while immersed in a continuously flowing stream of hot flue gases drawn from the passage 32 through conduit 120.

The temperature of the flue gases flowing past the spray nozzle 106 is adjusted to properly temper the rich oil vapors formed in the chamber 100 to yield a fuel vapor mixture of uniform and preselected heating value. Where the oil has been preheated to around 600° F., the flue gases are adjusted to have a temperature of approximately 1250° F., or somewhat higher, and are mixed with the oil spray in chamber 100 in the ratio of around 5.18 pounds of the oil to 40.3 cu. ft. of flue gases. The temperature of the hot flue gases flowing directly from the passage 32 may be tempered by cooler flue gases drawn from the stack 38 through the valved conduit 122.

In many instances it is desirable to place a blower fan 142 in the conduit 120 between the line 122 and the fan chamber 100 for the purpose of controlling this tempering and rate of flow of the flue gases. In any event the air and fuel vapor velocities within the burner tubes or ducts are maintained sufficiently low to avoid turbulence and to maintain streamline viscous flow of the hydrocarbons and air within the furnace adjacent the burner tubes. Preferably fluid fuel and air velocities of 10 ft. per second or less are employed. In small installations the vapor velocities are preferably maintained in the neighborhood of 1 to 4 linear ft. per second.

The fluid fuel mixture flows from the chamber 100 to the header 52 and is there distributed uniformly through certain of the burner tubes as described. Approximately 10 to 20 per cent of the total fuel vapors employed preferably is introduced through the lowermost row of burner tubes or ducts to form a protective fluid blanket over the material being heat-treated.

Alternating rows of ducts above the lowermost row thereof are in controlled communication with a source of air under pressure through header 60,—alternate ducts in the remaining rows communicating respectively with the said source of air under pressure and with the oil-vaporizing chamber.

Air is fed to the header 60 preferably through conduit 132 disposed within the regenerator chamber 36, whereby the air is preheated to a high temperature approximating that of the oil vapors and gases entering the fluid fuel tubes from the fuel header 52. The valved line 134 provides means for tempering the preheated air with cold air to maintain at a preselected temperature the air flowing to the burner. By suitably regulating the velocity of the air flowing to the header 88 and the temperature and volume of hot inert gases and oil flowing to the vaporization chamber 100, the velocities of the respective fluid streams flowing to the furnace through the burner are maintained approximately the same and below the turbulent combustion range.

In one application of the invention wherein a 1028 B. t. u. hydrocarbon vapor-gas mixture was developed and burned in accordance with the diffusion-flame or streamline type of combustion,—20 gallons per hour of No. 2 Gulf Oil previously described, preheated to 300° F., was sprayed into chamber 100 in the presence of hot flue gases having a temperature of around 1400° F. in the proportion of 20 gallons oil to 2470 cu. ft. of the flue gases. The diluted fuel vapors thus formed were flowed to and through the fuel ducts of the diffusion burner at a flow rate of approximately 2 ft. per second,—well within the limits for streamline viscous flow. Simultaneously air was introduced into the burner air ducts in amount to give approximately the same velocity of flow as that of the vapors. The flue gas temperature required at the atomizing chamber is considerably higher than that given above, where it is introduced cold into the atomizing chamber.

Other means in addition to those shown may be used for controlling the temperature and composition of the hot flue gases flowing to the atomizing chamber. For instance, flue gases of preselected composition high in inerts and having the required high temperature may be produced in a separate combustion chamber or alternatively flue gases somewhat richer in hydrocarbon may be withdrawn from the combustion chamber 12 at points near the burner through a valve-controlled line 144 connecting the interior of chamber 12 near the burner assembly with the conduit 120, and thereafter mixed with the flue gases withdrawn from other parts of the combustion chamber or from the stack. Any unvaporized oil flows from the furnace through conduit 126 and trap 128.

The presence of small amounts of oxygen-containing compounds in the flue gases, used in vaporizing the oil assists in retarding any carbon formation within the fuel vapors moving through the burner adjacent the burner tips due to heat radiated from the furnace interior. Any incipient thermal decomposition may be retarded also by the introduction of superheated steam or other hot fluid into the chamber 48 of the burner of Fig. 3 through the conduit 58. This also tends to eliminate any considerable differences in temperature between the hot fuel vapors flowing through the burner ducts 62 and the preheated air entering the burner through header 88. A small amount of steam may also be introduced in admixture with the fuel vapors or with the secondary air for the same purpose.

Where an inert gas such as nitrogen, a reducing gas such as hydrogen, or water gas is used instead of or in addition to the flue gases, these gases may be preheated to the required temperature by suitable means, as by indirect heat exchange with the highly heated flue gases leaving the furnace.

The invention is susceptible of modification within the scope of the appended claims.

1. The method of operating furnaces which comprises feeding heavy hydrocarbon fuel in liquid form into an enclosed chamber while simultaneously atomizing the same and vaporizing at least a regulated portion thereof by heat developed in the method, in the presence of a gas low in uncombined oxygen, and at an elevated temperature near but below that at which substantial thermal decomposition of hydrocarbon occurs, the amount of the said gas being proportioned with respect to the hydrocarbon vapors to give a mixed fluid fuel having a heating value in the range from 200 to 2000 B. t. u. per cu. ft., and thereafter simultaneously flowing the said fluid fuel and a combustion-supporting gas into a highly-heated enclosed space in parallel contacting streams at approximately equal velocities below the turbulent velocity range, the combustion-supporting gas being present in amount at least sufficient for the substantially complete combustion of the fluid fuel.

2. The method of operating furnaces which comprises continuously feeding hydrocarbon fuel in liquid form into an enclosed space while atomizing the same and vaporizing it by heat developed in the method in the presence of an inert gas while raising it to an elevated temperature below that at which substantial thermal decomposition of the hydrocarbon occurs, the amount of said gas being proportioned with respect to the hydrocarbon vapors to yield a mixed fluid fuel having a uniform heating value in the range from 200 to 2000 B. t. u. per cu. ft. and continuously and simultaneously flowing the said fluid fuel and a heated combustion-supporting gas into a highly-heated enclosed space in parallel contacting streams at approximately equal velocities below the turbulent velocity range, the said combustion-supporting gas being present in amount at least sufficient for the substantially complete combustion of the fluid fuel.

3. The method set out in claim 2, in which the said contacting streams flow at a linear velocity not greater than 10 ft. per second.

4. The method of operating furnaces, which comprises continuously preheating a liquid hydrocarbon, intimately mixing the preheated hydrocarbon in liquid form with a controlled amount of highly-heated flue gases formed in the method while atomizing the liquid hydrocarbon thereby vaporizing the same and forming a hot flue fuel mixture of uniform B. t. u. value in the range from 200 to 2000 B. t. u. per cu- ft., while maintaining the fuel mixture at an elevated temperature below that at which substantial cracking of the hydrocarbon occurs, flowing the fluid fuel mixture within an enclosed highly heated space of streamline shape, in a plurality of parallel contiguous streams, alternating streams comprising respectively the said fluid fuel mixture and a combustion-supporting gas moving at approximately the same velocity, effecting a progressive combustion within the said enclosed space by the gradual interdiffusion of the reacting constituents of the streams of the said fluid fuel mixture and combustion-supporting fluid, and controlling the rate of such interdiffusion thereby substantially retarding the rate of combustion.

5. The method of operating furnaces, which comprises continuously preheating a liquid hydrocarbon, intimately mixing the preheated hydrocarbon in liquid form with a controlled amount of a highly heated gas mixture low in oxidizing constituents while atomizing the liquid hydrocarbon, thereby vaporizing the same and forming a hot fluid fuel mixture of uniform B. t. u. value in the range from 500 to 2000 B. t. u. per cu. ft. while maintaining the mixture at an elevated temperature below 700° F. by heat developed in the method, conducting a plurality of spaced streams of the said fluid fuel mixture along an enclosed path free from abrupt changes in transverse cross-section, concurrently conducting a plurality of spaced streams of air along the said path at substantially the same velocity as the said fluid fuel mixture streams, the last-named streams being interspersed with the air streams to provide contiguous non-turbulent strata of air and of the said fluid fuel mixture, progressively burning portions of the latter at the interfaces of the same with the air during the said movement of these streams, and by the heat thus developed decomposing hydrocarbons in the interior of each of the said fluid fuel mixture streams progressively to form incandenscent carbon therein, and to develop and transmit heat.

6. The method of operating heating furnaces, which comprises continuously preheating a liquid hydrocarbon, intimately mixing the preheated hydrocarbon in liquid form with a controlled amount of highly-heated flue gases while atomizing the liquid hydrocarbon, thereby continuously vaporizing the same and forming a hot fluid fuel mixture of uniform B. t. u. value in the range from 200 to 2000 B. t. u. per cu. ft., while maintaining the mixture at a temperature below that at which substantial cracking of the hydrocarbon occurs, flowing past the material to be heated in an enclosed highly heated space free from abrupt changes in transverse cross-section throughout its length, a non-turbulent composite fluid stream composed of a plurality of contiguous parallel streams respectively of preheated air and of the said hot fluid fuel mixture flowing at approximately the same velocity, igniting and burning progressively portions of the said fluid mixture at its interfaces with the preheated air, and maintaining around the material being heated and between the said air streams and the said material a non-turbulent flowing stream of the said fluid fuel mixture, thereby substantially retarding oxidation of the material.

7. The method of producing and using furnace fuel, which comprises continuously preheating a liquid hydrocarbon fuel, intimately mixing the said preheated fuel in atomized form with an amount of highly heated flue gas produced in the process in amount sufficient to vaporize and superheat the hydrocarbons while maintaining them below their cracking temperature and while diluting the said vapors to yield a uniform fluid fuel mixture having a heating value in the range from 200 to 2000 B. t. u. per cu. ft., and simultaneously flowing the said fluid fuel mixture and a preheated combustion-supporting gas into a highly-heated space in parallel contacting streams at approximately equal velocities below the turbulent velocity range and in proportions for substantially complete combustion, thereby effecting a controlled progressive interdiffusion of the reacting constituents of the said contacting streams to effect a combustion reaction and the formation of highly heated flue gases, and utilizing the heat of the flue gases for preheating the liquid fuel subsequently to be used in the process.

8. The method of operating furnaces which comprises continuously preheating a liquid hydrocarbon fuel, intimately mixing the said preheated fuel in atomized form with an amount of highly heated flue gas sufficient to vaporize and superheat the hydrocarbons while maintaining them at a temperature below their cracking temperature and while continuously diluting the vapors to yield a uniform fluid fuel mixture having a heating value in the range from 200 to 2000 B. t. u. per cu. ft., flowing the said fluid fuel mixture and a preheated combustion-supporting gas into a highly-heated space free from abrupt changes in transverse cross section in parallel contacting streams flowing at approximately equal velocities below the turbulent velocity range and in proportions for at least substantially complete combustion, thereby effecting a progressive combustion adjacent the interfaces of the said fluid streams and producing hot flue gases, and utilizing the hot flue gases thus produced for vaporizing and diluting the atomized liquid hydrocarbon subsequently to be used in the process.

9. The method of operating furnaces, which comprises continuously preheating a liquid hydrocarbon fuel, intimately mixing the said preheated fuel in atomized form with an amount of highly-heated substantially inert gases approximately free of uncombined oxygen, sufficient to vaporize and superheat the atomized hydrocarbons while maintaining them below their cracking temperatures and while diluting the vapors to yield a uniform highly-heated fluid fuel mixture having a potential heating value within the range of 500 to 1000 B. t. u. per cu. ft., thereafter simultaneously flowing the said highly-heated fluid fuel mixture and preheated air into a combustion chamber in a plurality of parallel alternating contacting streams at velocities below the turbulent velocity range and in proportions for at least substantially complete combustion, progressively burning portions of the said fluid fuel mixture at the interfaces thereof with adjacent air streams, and by the heat thus developed progressively decomposing the hydrocarbons in the interior of each of the said fluid fuel streams to form incandescent carbon while producing highly-heated flue gases, tempering the flue gases, and thereafter utilizing the tempered flue gases for vaporizing and diluting the atomized liquid hydrocarbons subsequently to be used in the process.

10. The method of operating furnaces, which comprises continuously preheating a liquid hydrocarbon fuel, intimately and continuously mixing the said preheated fuel in atomized form with an amount of highly-heated flue gases in amount sufficient to vaporize and superheat at least the major portion of the hydrocarbons while maintaining the same below their cracking temperature and while diluting the vapors to yield a uniform fluid fuel having a heating value in the range of from 200 to 2000 B. t. u. per cu. ft., separating the superheated vapors from any unvaporized hydrocarbon and removing the latter, continuously flowing the former and preheated air into a highly-heated enclosed space in alternate parallel contacting streams at approximately equal velocities below the turbulent velocity range and in proportions for substantially complete combustion, thereby progressively burning portions of the fluid mixture at the interfaces of the respective fluid streams and, by the heat thus developed, decomposing the hydrocarbons in the interior of each of the said fluid fuel streams to progressively form incandescent carbon and to develop heat and flue gases, and utilizing selected portions of the heat of the said flue gases for preheating the air and for preheating and volatilizing the liquid hydrocarbon subsequently used in the process.

11. In combination, a furnace having an elongated combustion chamber substantially free from abrupt changes in transverse cross-section throughout its length, a burner disposed at one end of the said chamber and occupying the entire end thereof, the burner having therein a plurality of parallel ducts arranged in superposed rows, an oil-vaporizing chamber disposed within the furnace in communication with the combustion chamber through certain of the said ducts, the remaining ducts being in controlled communication with a source of air under pressure, an oil-atomizing means within the oil-vaporizing chamber, valve-controlled means for conducting oil to the oil-atomizing means, means for the controlled introduction of hot flue gases to the oil-vaporizing chamber, and means for removing unvaporized oil from the oil-vaporizing chamber.

12. In combination, a furnace having an elongated combustion chamber substantially free from abrupt changes in transverse cross section throughout its length, a burner disposed at one end of the said chamber and occupying at least the major portion of the end thereof, the burner having therein a plurality of parallel ducts arranged in superposed rows, an oil-vaporizing chamber disposed within the furnace in communication with the combustion chamber through certain of the said ducts, means for introducing air under pressure in controlled amounts into the remaining ducts, means for preheating the air flowing to the last-named ducts, means connected with the air-introducing means for tempering the preheated air flowing to the air ducts, oil-atomizing means in the oil-vaporizing chamber, means for conducting a regulated amount of oil to the oil-atomizing means, a conduit for introducing into the oil-vaporizing chamber a regulated amount of hot flue gases, and a separate conduit connected with the furnace and adapted to preheat the oil flowing to the oil-atomizing means.

13. In combination, a furnace having an elongated combustion chamber substantially free of abrupt changes in cross-section throughout its length, a burner disposed at one end of the chamber and adapted to fill the chamber at the said end, the burner having a plurality of ducts arranged in superposed rows, each of the ducts in the lowermost row communicating with an oil-vaporizing chamber disposed within the furnace and in controlled communication with the combustion chamber through the said ducts, alternating rows of ducts above the said bottom row thereof being in controlled communication with a source of air under pressure, contiguous ducts in the remaining rows thereof communicating respectively with the said source of air and with the said oil-vaporizing chamber, oil-atomizing means in the oil-vaporizing chamber, means for the controlled introduction of hot flue gases and of oil to the oil-vaporizing chamber, and independent means controlling the rate of flow of air to the said ducts.

14. In combination, a furnace having an elongated combustion chamber substantially free from abrupt changes in transverse cross-section, a burner disposed at one end of the said chamber, the burner having a plurality of parallel ducts arranged in superposed rows, an oil-vaporizing chamber disposed within the furnace and in permanent communication with the combustion chamber through certain of the said ducts, means for the regulated introduction of air under pressure into the remaining ducts, oil-atomizing means in the oil vaporizing chamber, valve-controlled conduit for conducting oil to the atomizing means, means for the controlled introduction of hot flue gases to the oil-vaporizing chamber, means for adjusting the temperature of the said hot flue gases flowing to the oil-vaporizing chamber, and means for separately withdrawing from the oil-vaporizing chamber any unvaporized oil.

15. Apparatus as in claim 14, including means associated with the furnace for preheating air flowing to the air ducts, and means within the furnace for preheating oil flowing to the oil-atomizing means.

16. In combination, a furnace having an elongated combustion chamber substantially free from abrupt changes in transverse cross-section, a burner disposed at one end of said chamber, the burner having a plurality of parallel ducts arranged in superposed rows, an oil-vaporizing chamber disposed within the furnace and in permanent communication with the combustion chamber through certain of the said ducts, means for the regulated introduction of air under pressure into the remaining ducts, oil-atomizing means in the oil vaporizing chamber, a valve-controlled conduit for conducting oil to the atomizing means, means for the controlled introduction of hot flue gases to the oil vaporizing chamber, means including a fan member for rapidly and intimately intermixing the hot flue gases and atomized oil, means for adjusting the temperatures of the said hot flue gases flowing to the oil-vaporizing chamber, and means for separately withdrawing from the oil-vaporizing chamber any unvaporized oil.

17. In combination, a furnace having an elongated combustion chamber substantially free from abrupt changes in transverse cross-section, a burner disposed at one end of said chamber, the burner having a plurality of parallel ducts arranged in superposed rows, an oil-vaporizing chamber disposed within the furnace and in permanent communication with the combustion chamber through certain of the said ducts, means for the regulated introduction of air under pressure into the remaining ducts, oil-atomizing means in the oil vaporizing chamber, a valve-controlled conduit for conducting oil to the atomizing means, means for the controlled introduction of hot flue gases to the oil vaporizing chamber, means including a hot fan member for intimately mixing a preselected amount of the hot flue gases with the atomized oil and for flowing the said mixture at a controlled rate into the oil vapor ducts, means for adjusting the temperatures of the said hot flue gases flowing to the oil-vaporizing chamber, and means for separately withdrawing from the oil-vaporizing chamber any unvaporized oil.

18. In combination, a furnace having an elongated combustion chamber substantially free from abrupt changes in transverse cross-section, a burner disposed at one end of said chamber, the burner having a plurality of parallel ducts arranged in superposed rows, an oil-vaporizing chamber disposed within the furnace and in permanent communication with the combustion chamber through certain of the said ducts, means for the regulated introduction of air under pressure into the remaining ducts, the arrangement of the respective ducts being such that the lowermost row thereof and alternate ducts in the alternate rows above the lowermost row are in permanent communication with the oil-vaporizing chamber, the remaining ducts in the burner being in permanent communication with a source of air under pressure, oil atomizing means in the oil vaporizing chamber, a valve-controlled conduit for conducting oil to the atomizing means, means for the controlled introduction of hot flue gases to the oil vaporizing chamber, means including a hot fan member for intimately mixing a preselected amount of the hot flue gases with the atomized oil and for flowing the said mixture at a controlled rate into the oil vapor ducts, means for adjusting the temperature of the said hot flue gases flowing to the oil-vaporizing chamber, and means for separately withdrawing from the oil-vaporizing chamber any unvaporized oil.

19. A furnace comprising an elongated combustion chamber having a streamline inner surface construction, a burner adjacent an end of the said chamber and approximately filling the same, an oil vaporizing chamber within the furnace, the said burner comprising a plurality of superposed parallel ducts, means for flowing into certain of the ducts streams of air at a controlled rate, the said oil vaporization chamber being in open communication with the combustion chamber through the remaining or fluid fuel ducts, the lowermost row of ducts being fluid fuel ducts and the arrangement being such that the remaining fluid fuel ducts are surrounded by air ducts, oil atomizing means within the oil vaporization chamber, means for the controlled introduction of hot flue gases into the said vaporization chamber, means for the regulated flow of liquid fuel to the oil atomizing means, oil and air preheating means operatively associated with the furnace, and means in the oil vaporization chamber for intimately intermixing hot flue gases and atomized oil and for regulating the flow of the resultant fuel mixture to the burner.

20. The method of operating furnaces, which comprises feeding finely divided fuel into a heated chamber maintained at an elevated temperature but below that at which substantial thermal decomposition of the fuel occurs, and suspending the fuel within the chamber in a hot gas low in uncombined oxygen, the amount of the said gas being proportioned with respect to the suspended fuel to give a mixture having a heating value within the range from 200 to 2000 B. t. u. per cu. ft., thereafter concurrently flowing the said fuel mixture and a combustion supporting gas into a highly heated enclosed space in parallel contacting streams, at velocities below the turbulent velocity range and adapted to facilitate streamline flow of the fuel mixture within the furnace, the said combustion-supporting gas being present in amount at least sufficient for the substantially complete combustion of the fuel.

ALBERT L. KLEES.